(12) United States Patent
Geyer et al.

(10) Patent No.: US 9,197,327 B2
(45) Date of Patent: Nov. 24, 2015

(54) OPTICAL COMMUNICATION TRANSMITTER SYSTEM

(75) Inventors: Jonas Geyer, Seukendorf (DE); Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 13/602,682

(22) Filed: Sep. 4, 2012

(65) Prior Publication Data

US 2014/0064743 A1 Mar. 6, 2014

(51) Int. Cl.
| H04B 10/04 | (2006.01) |
| H04B 10/516 | (2013.01) |
| H04L 25/05 | (2006.01) |

(52) U.S. Cl.
CPC .............. *H04B 10/516* (2013.01); *H04L 25/05* (2013.01)

(58) Field of Classification Search
CPC ............................ H04B 10/516; H04L 25/05
USPC ......................................................... 398/182
See application file for complete search history.

(56) References Cited

U.S. PATENT DOCUMENTS

| 5,263,048 | A | 11/1993 | Wade | |
| 6,311,158 | B1 | 10/2001 | Laroche | |
| 7,035,201 | B2 * | 4/2006 | Fu et al. | 370/208 |
| 8,750,726 | B2 * | 6/2014 | Geyer | 398/208 |
| 8,798,471 | B2 * | 8/2014 | Gaete et al. | 398/76 |
| 8,831,439 | B2 * | 9/2014 | Wu et al. | 398/183 |
| 2003/0063219 | A1 * | 4/2003 | Bellers | 348/572 |
| 2007/0183520 | A1 | 8/2007 | Kim et al. | |
| 2009/0245422 | A1 * | 10/2009 | Sampath et al. | 375/302 |
| 2010/0098191 | A1 * | 4/2010 | Morris et al. | 375/322 |
| 2010/0123924 | A1 * | 5/2010 | Kumada | 358/1.15 |
| 2010/0189443 | A1 * | 7/2010 | Krause et al. | 398/115 |
| 2010/0329397 | A1 * | 12/2010 | Kim | 375/345 |
| 2011/0182582 | A1 * | 7/2011 | Yang et al. | 398/65 |
| 2012/0263481 | A1 * | 10/2012 | Ip et al. | 398/193 |
| 2013/0028178 | A1 * | 1/2013 | Comeau | 370/328 |
| 2013/0034189 | A1 * | 2/2013 | Ye | 375/298 |

FOREIGN PATENT DOCUMENTS

| EP | 1679813 | 7/2006 |
| GB | 2302777 | 1/1997 |

OTHER PUBLICATIONS

Floyd M. Gardner, Interpolation in Digital Modems-Part 1: Fundamentals, IEEE Transactions on Communications, vol. 41, No. 3, pp. 501-507, Mar. 1993.

Lars Erup et al., "Interpolation in Digital Modems-Part II: Implementation and Performance," IEEE Transactions on Communications, vol. 41, No. 6, pp. 998-1008, Jun. 1993.

International Search Report and Written Opinion from corresponding International Application No. PCT/US2013/057194, 11pp., Nov. 21, 2013.

* cited by examiner

*Primary Examiner* — Ken Vanderpuye
*Assistant Examiner* — Amritbir Sandhu

(57) ABSTRACT

An optical transmitter may include a sample rate converter and a digital-to-analog converter operable to convert an inputted digital electrical signal to an analog optical signal. The signal converter may include a first interface operable to receive a digital electrical signal that may include a block of input data having N symbols in a time domain. The signal converter may also include: a first module operable to transform, via a Fourier Transform, the input data having N symbols from the time domain to a frequency domain; a second module operable to up-sample the N frequency domain samples so that there are 1.6N, 2N, or 2.67N frequency domain samples, for example; and then a third module operable to transform, via an inverse Fourier Transform, the 1.6N, 2N, or 2.67N frequency domain samples to an equivalent number of time domain samples at 1.6, 2.0, or 2.67 samples per symbol, respectively.

20 Claims, 8 Drawing Sheets

OPTICAL COMMUNICATION TRANSMITTER SYSTEM

FIELD

The present disclosure relates generally to optical communication systems.

BACKGROUND

Fiber-optic communication systems have revolutionized the telecommunications industry. Optical fibers have largely replaced copper wire due to the advantages of fiber-optic communications over copper wire communications.

In order to implement fiber-optic communication, one node of a fiber-optic network generates an optical signal that is transmitted along optical fiber. Then another node of the fiber-optic network may receive the optical signal and convert the optical signal into an electrical signal. The generated optical signal may be derived from an electrical signal as well. Typically, along with optical fibers and control units, transceivers with the capability to convert an electrical signal to an optical signal (and vice versa) enable optical networks. Additionally, other devices besides control units, such as optical-amplification systems make fiber-optic communications viable. Such systems along with other devices ensure that a communicated optical signal does not become too distorted or weak.

DESCRIPTION OF EXAMPLE EMBODIMENTS

Overview

Figure 1:
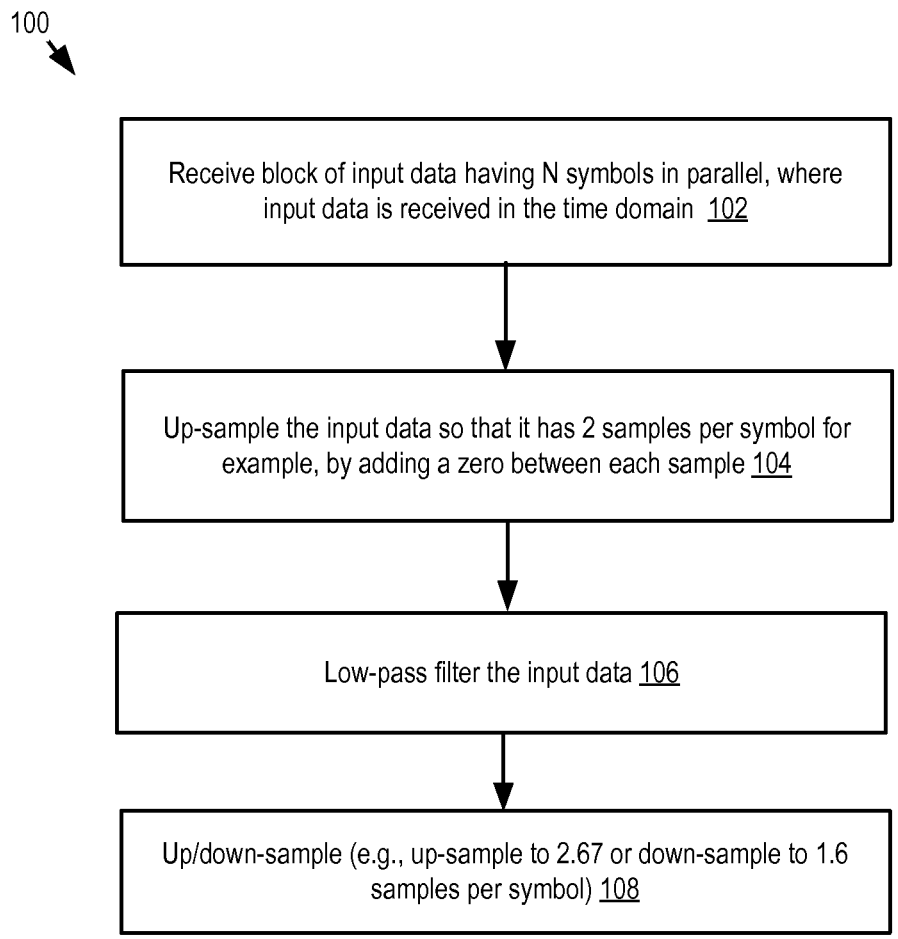
FIG. 1 illustrates a flow chart of an example data conversion in the time domain that may be performed by a sample rate converter.

An optical transmitter (such as a baud-rate flexible transmitter) that may include a signal converter and a digital-to-analog converter operable to convert an inputted digital electrical signal to an analog optical signal. The signal converter may include a first interface operable to receive a digital electrical signal that may include a block of input data having N symbols in a time domain. The signal converter may also include: a first module operable to transform, via a Fourier Transform for example, the input data from the time domain to a frequency domain; a second module operable to duplicate N frequency domain samples of the transformed input data so that there are 2N frequency domain samples; and then a third module operable to transform, via an inverse Fourier Transform, the 2N frequency domain samples from the frequency domain to the time domain so that there are 2N time domain samples. The third module may also be operable to send the 2N time domain samples to a fixed-sample-rate digital-to-analog converter. The optical transmitter may also include: a second interface operable to interface the third module to the digital-to-analog converter; and a third interface operable to transmit the analog optical signal.

In one aspect, the digital-to-analog converter is operable to convert the digital electrical signal to an analog optical signal following the third module's transformation of the input data from the frequency domain to the time domain.

In another aspect, the optical transmitter may also include a fourth module operable to spectral shape the duplicated frequency domain samples prior to the third module's transformation of the input data from the frequency domain to the time domain. The optical transmitter may also include a fifth module operable to discard a set of samples from the duplicated frequency domain samples prior to the third module's transformation of the input data from the frequency domain to the time domain and/or prior to the fourth module's spectral shaping of the duplicated samples. In addition to or alternative to the fifth module, the optical transmitter may also include a module operable to pad the duplicated samples prior to the third module's transformation of the input data from the frequency domain to the time domain and/or prior to the fourth module's spectral shaping of the duplicated samples.

In another aspect, the first module of the optical transmitter may include: a sub-module operable to arrange the input data into multiple parts; and a set of sub-modules operable to transform, via respective sub-Fourier Transforms for example, each of the multiple parts of the input data from the time domain to a frequency domain, independently. The first module may also include another sub-module operable to rearrange the input data to its original order subsequent to the transformation of each of the multiple parts of the input data from the time domain to a frequency domain.

EXAMPLE EMBODIMENTS

Optical transmitters for coherent transmission systems may use a spectral shaper to generate spectrally shaped optical signals prior to inputting the signals to a digital-to-analog converter (DAC). The DAC may generate electrical signals carrying different data rates (such as, 150 Gbit/s, 200 Gbit/s, and 250 Gbit/s). This may be accomplished by changing sampling rate of a DAC and maintaining a fixed ratio with respect to symbol rate and sample rate, such as two samples per symbol. In one embodiment, a symbol may be a pulse (in digital baseband transmission) representing an integer number of bits. Symbol rate (also known as baud rate) may be the number of symbol changes (waveform changes) made to a transmission medium per a time period. The symbol rate may be measured in baud (Bd) or symbols per second, for example. Each symbol can represent or convey one or more bits of data.

Producing a reconfigurable sample rate DAC that generates electrical signals at different data rates, especially at relatively high data rates, such as 150 Gbit/s, 200 Gbit/s, and 250 Gbit/s, may be difficult. Alternatively, a baud-rate flexible transmitter that uses a fixed-sample-rate DAC may be beneficial. The baud-rate flexible transmitter may operate at different data rates and maintain a same sampling rate. This may be accomplished by using digital resampling.

The baud-rate flexible transmitter may process data signals at various high data rates, such as the data rates mentioned above. One aspect of the transmitter may perform spectral signal shaping, and then a resulting shaped signal may be inputted into a high speed DAC of the transmitter. To allow for spectral shaping the transmitter can oversample the data to more than one sample per symbol. Once oversampled, modules of the transmitter can apply signal processing methods giving the optical signal well defined spectral shape.

For example, the transmitter may process 200 Gbit/s using two samples per symbol for signal processing (which is 2-times up-sampling). Using a higher order modulation format, such as 16QAM, in combination with polarization multiplexing in an optical domain, each symbol may have 8 bits and the DAC may operate at approximately 50 Giga-samples per second (Gsamples/s), for example. To allow for processing at 150 Gbits/s and 250 Gbits/s, the DAC may run at different sample rates or a sample rate converter may convert the data to a different oversample rate, such as 2.67 or 1.6 samples per symbol, by applying signal processing in the digital domain. In conjunction with the sample rate converter, the DAC may operate at a fixed sample rate independent of the data processing rate of other modules of the transmitter. For example, the converter may up-sample 2-times per symbol (such as converting N symbols to 2N samples with 2 samples per symbol). Further, the sample rate converter may filter (to prevent aliasing, for example) and interpolate via a digital interpolator (such as digital cubic interpolator) to achieve a desired sample rate (such as 8/3 or 8/5 samples per symbol) expected by the DAC.

Further, the sample rate converter may operate using different techniques. For example, in one technique the converter may perform the conversion in the time domain alone. In other techniques, the converter may perform a conversion in the frequency domain. Below, examples of such conversions are provided through the descriptions of FIGS. 1-8.

FIG. 1 illustrates a flow chart of an example data conversion in the time domain (100) that may be performed by a sample rate converter. The data conversion (100) begins with receiving a block of digital input data having N symbols (102). The inputting of the data as well as other aspects of the conversion may be performed in parallel.

Next, the sample rate converter, up-samples the input data, so that the input data may include two samples per symbol, for example (104). This up-sampling may occur by padding the input data, such as adding a zero between each sample.

Next, a low-pass filter of the sample rate converter may filter the input data (106). Then the sample rate converter may up/down-sample the data to a number or rate of samples-per-symbol that the DAC may expect (108), such as 2.67 or 1.6 samples per symbol. This re-sampling process may be used when the initial up-sampling does not achieve the appropriate amount or rate of samples for a fixed-rate DAC.

Figure 2:
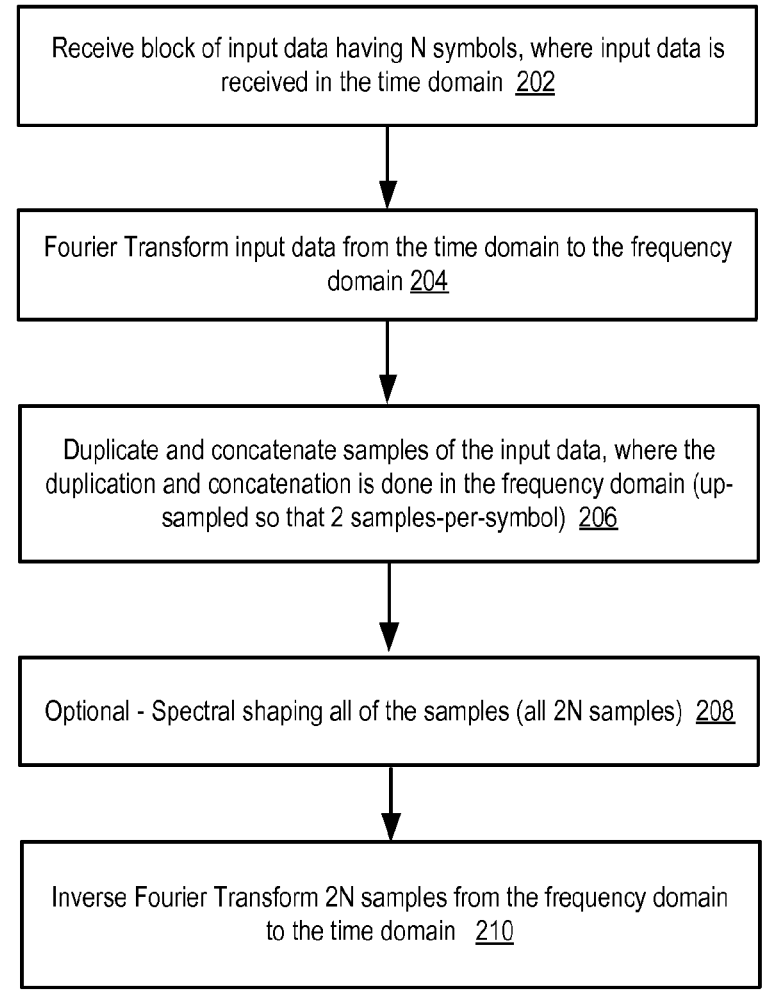
FIG. 2 illustrates another flow chart of an example data conversion in the frequency domain that may be performed by a sample rate converter, such as the sample rate converter depicted in FIG. 5.
Figure 5:
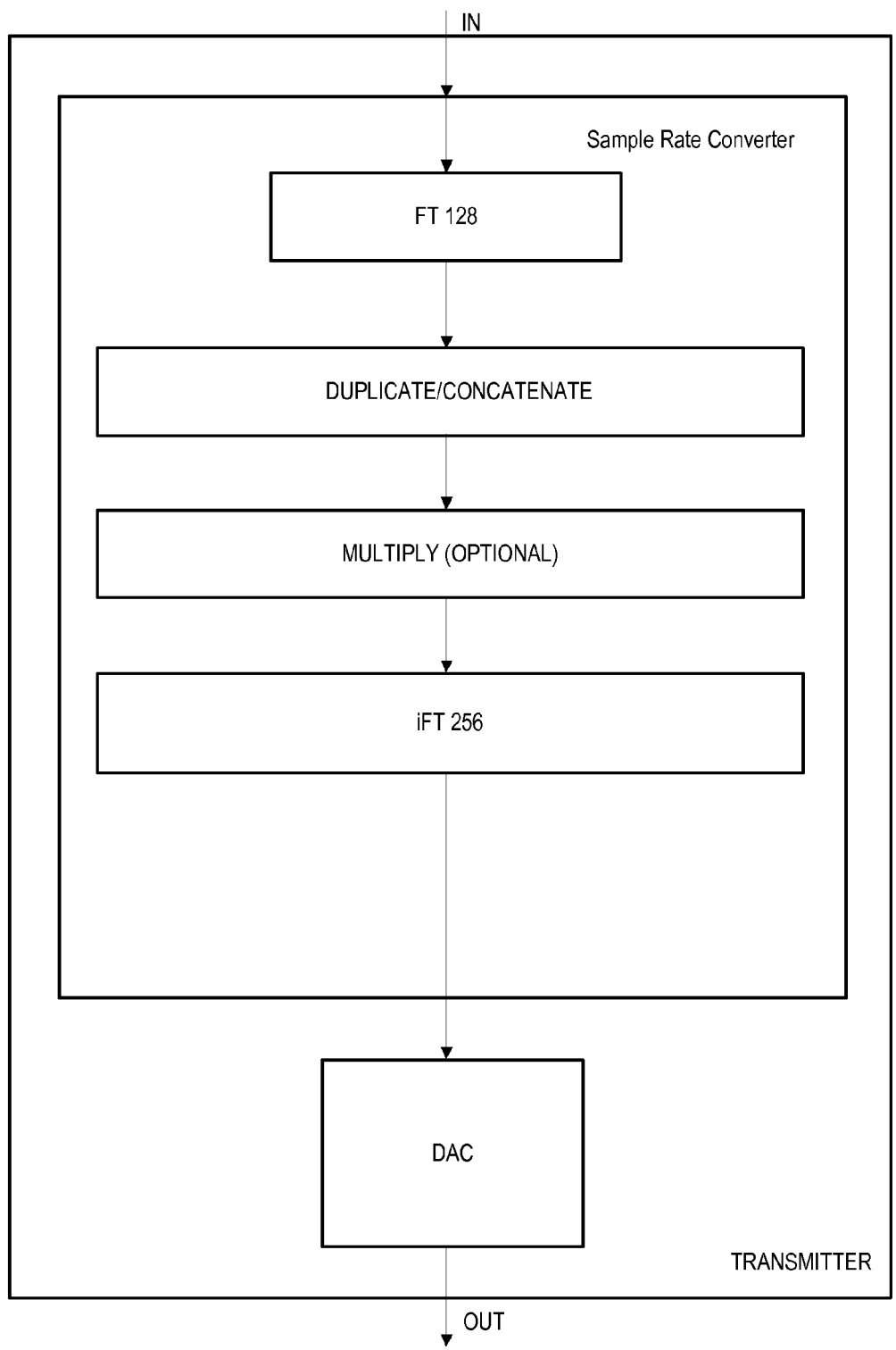
FIG. 5 illustrates a block diagram of an example transmitter including a sample rate converter.

FIG. 2 illustrates a flow chart of an example data conversion occurring in the frequency domain (200) that may be performed by a sample rate converter, such as the sample rate converter depicted in FIG. 5. The conversion may start with the sample rate converter receiving input data (202). The input data may include N symbols, and the symbols may be received in parallel. Further, the symbols may be received in the time domain.

Next, a Fourier Transform (FT) module (such as a Fast Fourier Transform (FFT) module) may transform the input data from the time domain to the frequency domain (204). Next, another module may duplicate and/or concatenate the frequency domain samples of the input data, so the data is up-sampled (such as up-sampled so that there are two samples-per-symbol) (206). This duplication and/or concatenation of the samples of the input data may include interpolation, concatenation, estimation, or any other mechanism of up-sampling. Alternatively, another module may spectral shape all the samples (such as all 2N samples) (208). Then, an inverse Fourier Transform (iFT) module (such as an inverse Fast Fourier Transform (iFFT)) may transform the data from the frequency domain to the time domain (210).

Figure 3:
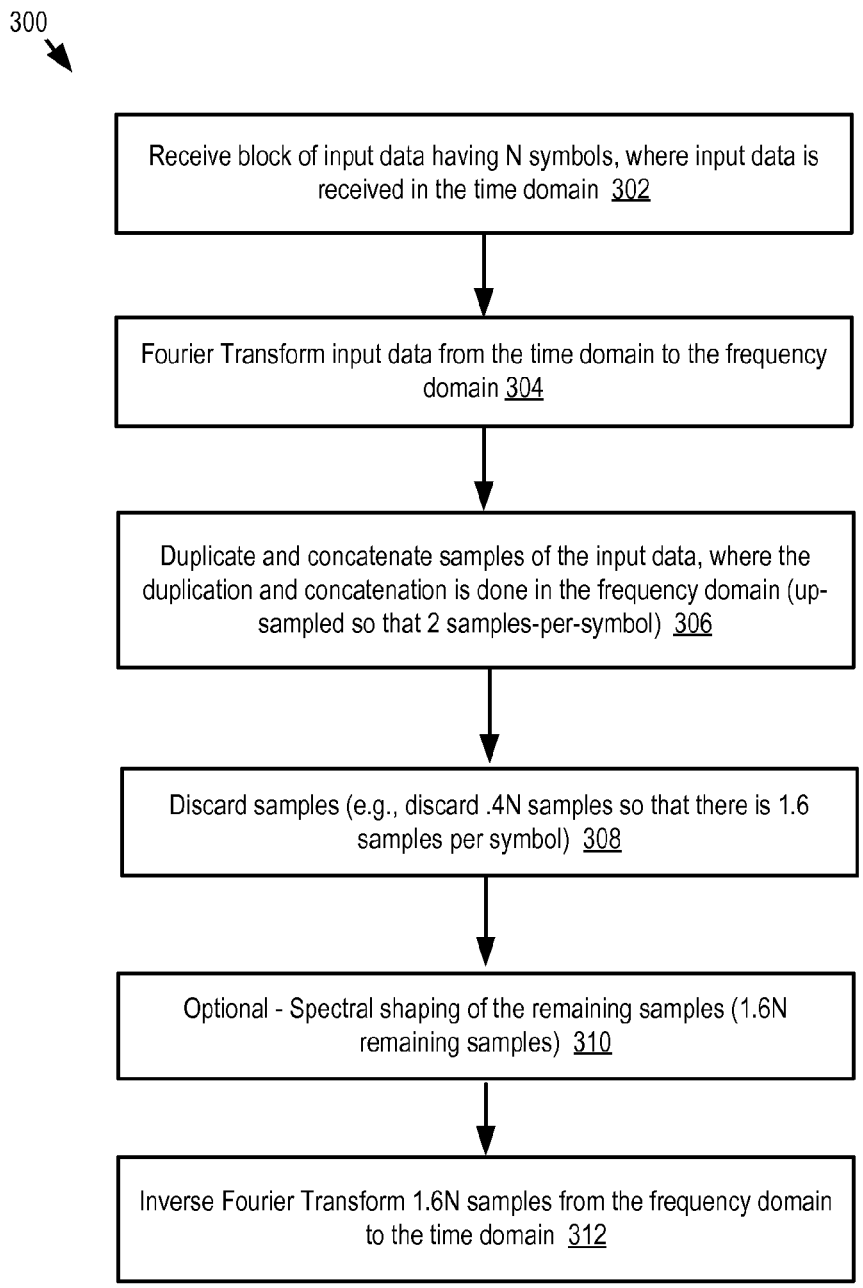
FIG. 3 illustrates another flow chart of an example data conversion in frequency domain that may be performed by a sample rate converter that can discard samples in the data, such as the sample rate converter depicted in FIG. 6.
Figure 6:
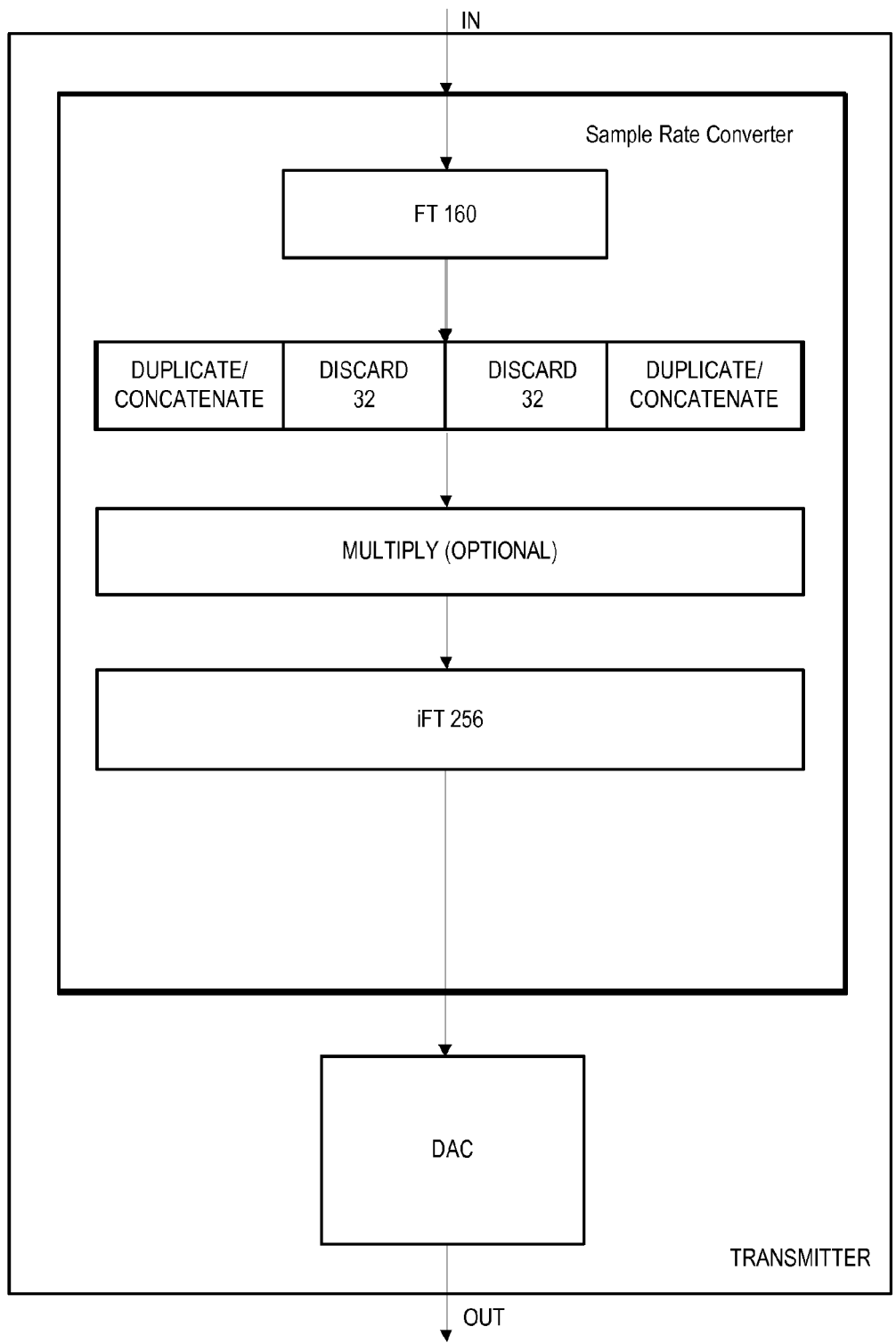
FIG. 6 illustrates a block diagram of an example transmitter including a sample rate converter that can discard samples.

FIG. 3 illustrates another flow chart of an example data conversion in the frequency domain (300) that may be performed by a sample rate converter that can discard samples in the data, such as the sample rate converter depicted in FIG. 6. In this figure, the conversion processes 302-306 are similar to 202-206, respectively. Then, at 308, after duplication and concatenation, a module may discard a certain number of samples (such as discards 0.4N samples of 2N frequency domain samples so that there are 1.6 samples per symbol). Alternatively, another module may spectral shape the remaining samples (such as spectral shape 1.6N remaining samples) (310). Then, an iFT module may transform the remaining data from the frequency domain to the time domain (312).

Figure 4:
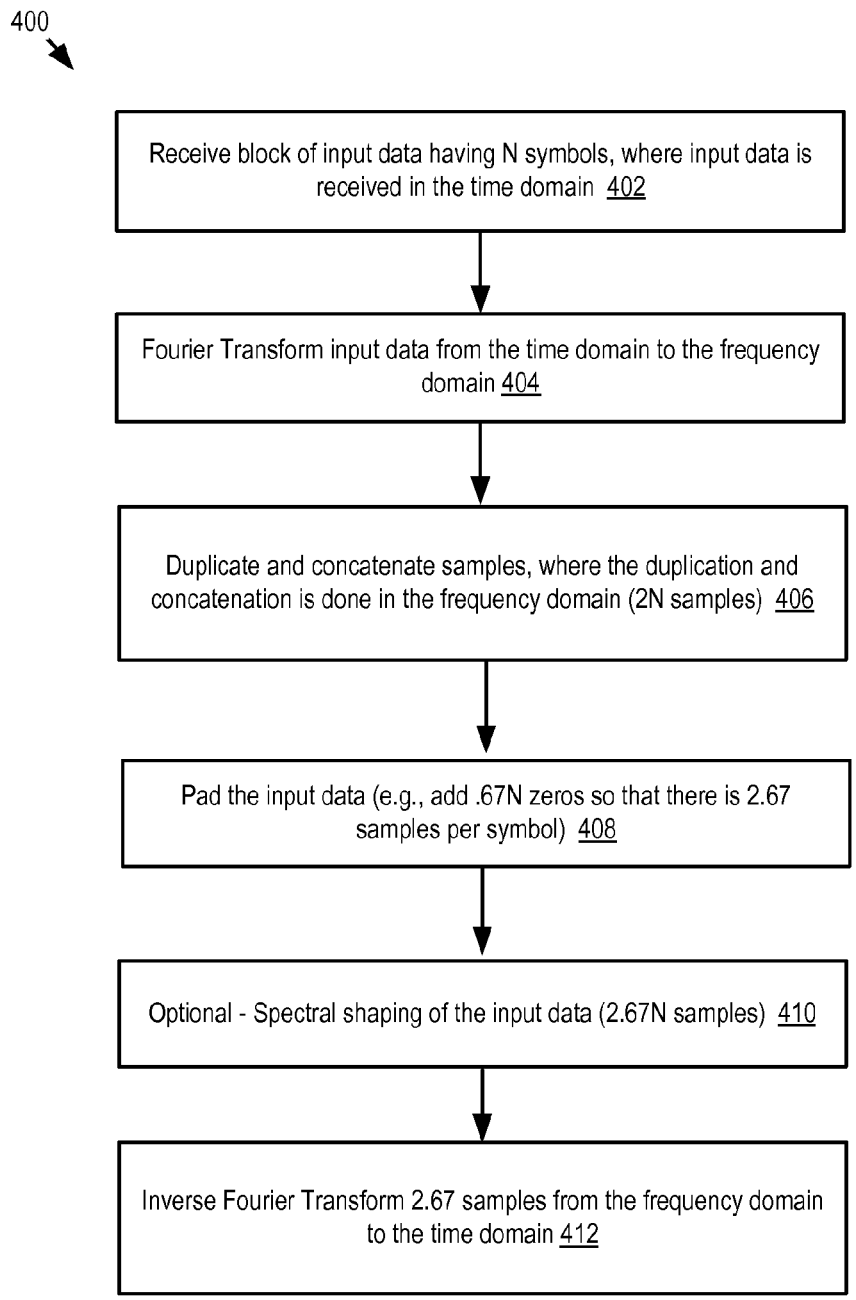
FIG. 4 illustrates another flow chart of an example data conversion in frequency domain that may be performed by a sample rate converter that can pad samples (such as add zeros to samples), such as the sample rate converter depicted in FIG. 7.
Figure 7:
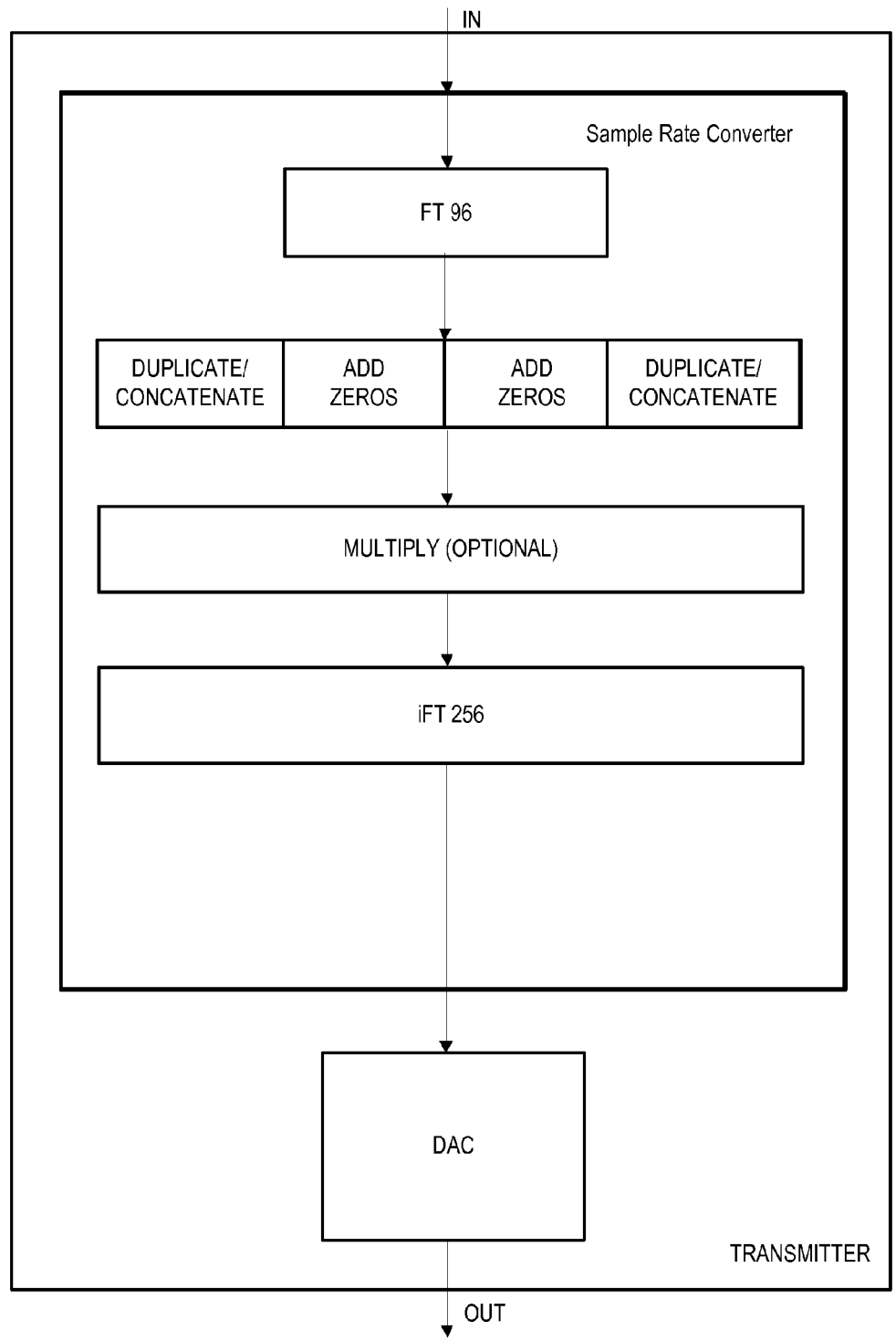
FIG. 7 illustrates a block diagram of an example transmitter including a sample rate converter that can pad samples (such as add zeros to the samples).

FIG. 4 illustrates another flow chart of an example data conversion in the frequency domain (400) that may be performed by a sample rate converter that can pad samples (such as add zeros to the samples), such as the sample rate converter depicted in FIG. 7. In this figure, the conversion processes 402-406 are similar to 202-206, respectively. Then, at 408, after duplication and concatenation, a module may pad the input data (such as adds zeros to the input data, such as adds 0.67N zeros to 2N input samples so that there are 2.67 samples per symbol). Alternatively, a module may spectral shape the samples (such as shapes the 2.67N samples) (410). Then, an iFT module may transform the data from the frequency domain to the time domain (412).

In another example data conversion (not depicted in the FIGS. 1-4), parts of the N symbols may overlap by M samples. In one example, the M samples may include ¼ the amount of samples relative to the N symbols. Consequently, where there is such overlap, additional samples may be discarded at the output of the iFT. In one example, the amount of the additional discarded samples may equal the same percentage as the percentage of samples overlapping in the input data.

FIG. 5 illustrates a block diagram of an example transmitter including a sample rate converter, which may convert the data to 2 samples per symbol. As depicted, the transmitter may include a sample rate converter and a DAC. The sample rate converter may include a FT module for 128 samples, a duplication and concatenation module, optionally a spectral shaping module (such as a multiplication module), and an iFT module for 256 samples.

FIG. 6 illustrates a block diagram of an example transmitter including a sample rate converter that can discard samples, which may convert the data to 1.6 samples per symbol. As depicted, the transmitter may include a sample rate converter and a DAC. The sample rate converter may include a FT module for 160 samples, a duplication and concatenation module, optionally a spectral shaping module (such as a multiplication module), and an iFT module for 256 samples. Differing from FIG. 5, the duplication and concatenation module may include sub-modules for discarding 64 samples, so that after duplicating 160 samples and discarding 64 samples, 256 samples remain. For example, there may be two sub-modules each discarding 32 samples for each instance of the 160 samples, respectively.

FIG. 7 illustrates a block diagram of an example transmitter including a sample rate converter that can pad samples (such as add zeros to the samples), which may convert the data to 2.67 samples per symbol. As depicted, the transmitter may include a sample rate converter and a DAC. The sample rate converter may include a FFT module for 96 samples, a duplication and concatenation module, optionally a spectral shaping module (such as a multiplication module), and an iFFT module for 256 samples. Differing from FIG. 5, the duplication and concatenation module may include sub-modules for padding the data (such as add zeros), so that after duplicating the 96 samples, 64 samples may be added, so that 256 samples result.

Figure 8:
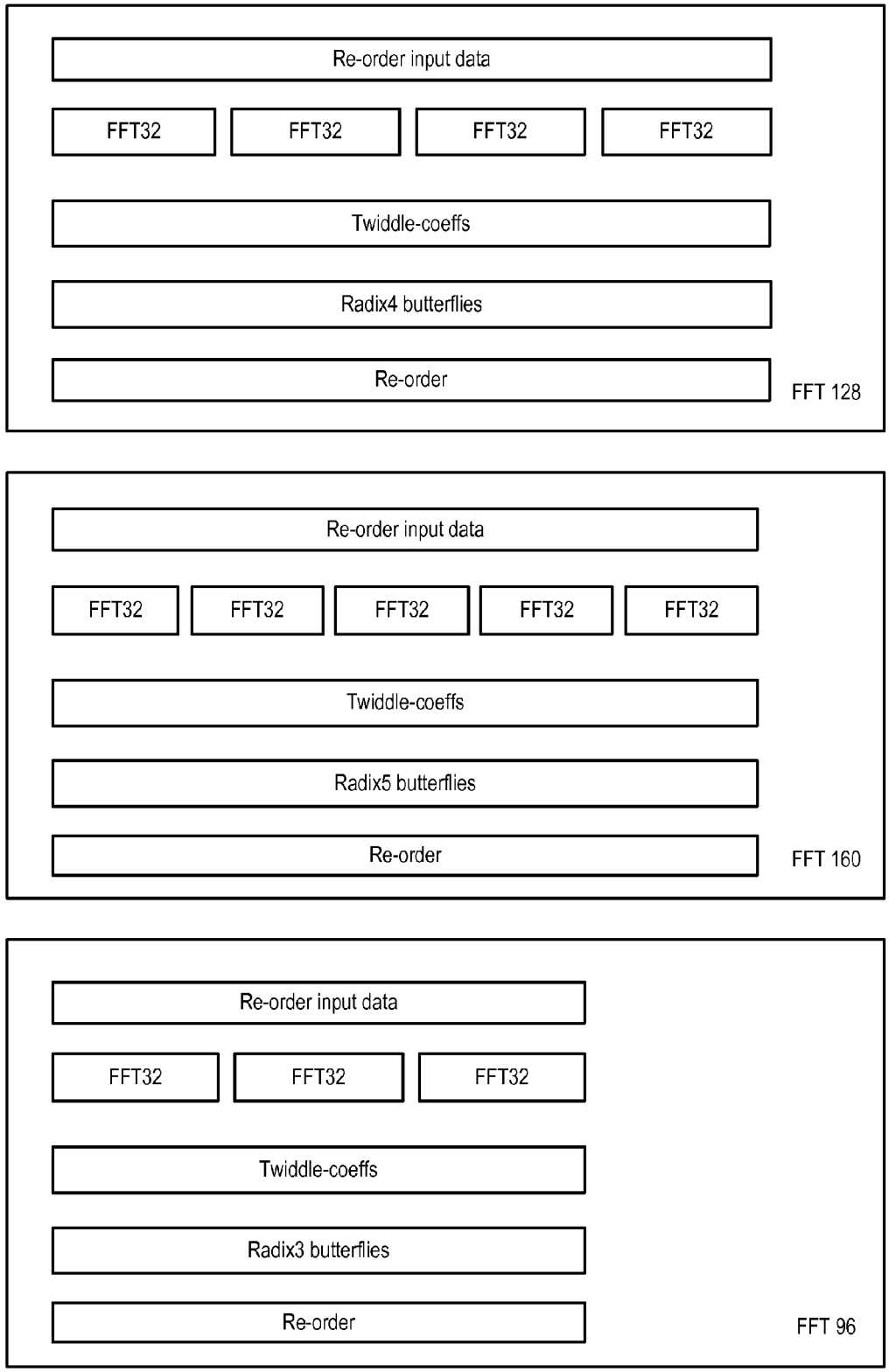
FIG. 8 illustrates block diagrams of examples of the respective FFT modules of FIGS. 5, 6, and 7.

FIG. 8 illustrates example block diagrams of the respective FFT modules of FIGS. 5, 6, and 7. For the FFT 128 module, the FFT 160 module, and the FFT 96 module, each FFT 32 module of these FFT modules may be associated with a twiddle-coefficients module and a respective radix butterflies module. For example, the FFT 128 module of FIG. 5, may include a module for rearranging the input data (such as re-ordering the input data), four FFT modules for 32 samples (four FFT 32 modules), a twiddle-coefficients module, a radix-4 butterflies module, and a module for rearranging output data, as shown in FIG. 8. Also, as shown in FIG. 8, the FFT 160 module of FIG. 6, may include a module for rearranging the input data (such as re-ordering the input data), five FFT modules for 32 samples, a twiddle-coefficients module, a radix-5 butterflies module, and a module for rearranging output data. Respectively, the FFT 96 of FIG. 7 may include a module for rearranging the input data (such as re-ordering the input data), three FFT modules for 32 samples, a twiddle-coefficients module, a radix-3 butterflies module, and a module for rearranging output data.

A twiddle-coefficients module may generate any data-independent-multiplication constant for their respective FFT module. For example, a twiddle-coefficients module may generate respective twiddle-coefficients for a respective radix-r butterflies module (such as a radix-3 butterflies module, a radix-4 butterflies module, or a radix-5 butterflies module).

A respective radix butterflies module may include a sub-module that combines results of smaller FFT modules (such as the FFT 32 modules) into a larger FFT. Also, a respective radix butterflies module may include a sub-module that does the opposite (dividing a larger FFT into sub-transforms). Further, a respective radix butterflies module may include a sub-module that recursively breaks down a FFT of composite size n=rm into r smaller transforms of size m where r is the radix of the transform. A respective radix butterflies module then may combine the smaller FFTs via radix-r butterflies, which themselves may be FFT modules of size r (performed m times on corresponding outputs of the sub-transforms) pre-multiplied by roots of unity, such as twiddle-coefficients generated from a twiddle-coefficients module. This aforementioned process may be referred to as "decimation in time". Further, the radix butterflies modules may perform the aforementioned process in reverse, which may be considered "decimation in frequency", where the butterflies may be determined first and are post-multiplied by the twiddle-coefficients.

With respect to the modules (such as the sample rate converters) described herein and depicted in the FIGS. 5-8, each type of module may be a separate module or a different configuration of the module. In other words, the transmitter may have a converter per baud-rate or one converter that may adjust to various baud-rates, for example.

Also, the term "module" may be defined to include a plurality of executable modules. As described herein, modules, such as the DAC or the sample rate converter, are defined to include software, hardware or some combination thereof, executable by a processor for example. Software modules may include instructions stored in memory (such as a computer readable storage media) that are executable by a processor. Hardware modules may include various devices, components, circuits, gates, circuit boards, and the like that are executable, directed, and/or controlled for performance by a processor. Furthermore, other aspects of the transmitter or combination of aspects may be a module.

With respect to the above descriptions, various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method performed by a signal processor of a baud-rate flexible optical transmitter, comprising:
   receiving a digital electrical signal comprising a block of input data having N symbols in a time domain;
   transforming the input data from the time domain to a frequency domain, resulting in first transformed data;
   duplicating and concatenating N frequency domain samples of the first transformed data so that there are 2N frequency domain samples, resulting in duplicated data;
   transforming the duplicated data from the frequency domain to the time domain so that there are 2N time domain samples, resulting in second transformed data; and
   communicating the second transformed data to a fixed-sample-rate digital-to-analog converter.

2. The method of claim 1, further comprising: converting, by the digital-to-analog converter, the second transformed data to an analog optical signal.

3. The method of claim 1, further comprising:
   spectral shaping the duplicated data, resulting in spectral-shaped data; and
   transforming the spectral-shaped data from the frequency domain to the time domain so that there are spectral-shaped 2N time domain samples.

4. The method of claim 1, further comprising:
   discarding a set of samples from the 2N frequency domain samples of the duplicated data, resulting in down-sampled data; and
   transforming the down-sampled data from the frequency domain to the time domain so that there are time domain samples between 2N and N.

5. The method of claim 1, further comprising:
   discarding a set of samples from the 2N frequency domain samples of the duplicated data, resulting in down-sampled data;
   spectral shaping the down-sampled data, resulting in down-sampled-and-spectral-shaped data; and
   transforming the down-sampled-and-spectral-shaped data from the frequency domain to the time domain so that there are spectral-shaped time domain samples between 2N and N.

6. The method of claim 1, further comprising:
   padding the 2N frequency domain samples of the duplicated data, resulting in up-sampled data; and transforming the up-sampled data from the frequency domain to the time domain so that there are greater than 2N time domain samples.

7. The method of claim 1, further comprising:
padding the 2N frequency domain samples of the duplicated data, resulting in up-sampled data;
spectral shaping the up-sampled data, resulting in up-sampled-and-spectral-shaped data; and
transforming the up-sampled-and-spectral-shaped data from the frequency domain to the time domain so that there are greater than 2N spectral-shaped time domain samples.

8. The method of claim 6, wherein the padding includes adding zeros to the 2N frequency domain samples.

9. The method of claim 1, wherein the transforming of the input data having N symbols from the time domain to the frequency domain, further comprises:
arranging the input data having N symbols into multiple parts; and
transforming each of the multiple parts of the input data having N symbols from the time domain to the frequency domain, independently.

10. The method of claim 9, wherein the transforming of the input data having N symbols from the time domain to the frequency domain, further comprises: rearranging the input data having N symbols to its original order subsequent to the transforming of each of the multiple parts of the input data having N symbols from the time domain to the frequency domain.

11. A signal processor of a baud-rate flexible optical transmitter, comprising:
an interface configured to receive a digital electrical signal comprising a block of input data having N symbols in a time domain;
first circuitry configured to transform, via a Fourier Transform, the input data having N symbols from the time domain to a frequency domain, resulting in first transformed data comprising N frequency domain samples;
second circuitry configured to duplicate and concatenate the N frequency domain samples of the first transformed data resulting in duplicated data comprising 2N frequency domain samples; and
third circuitry configured to transform, via an inverse Fourier Transform, the duplicated data from the frequency domain to the time domain resulting in second transformed data comprising 2N time domain samples, and communicate the second transformed data to a fixed-sample-rate digital-to-analog converter.

12. The baud-rate flexible optical transmitter of claim 11, further comprising:
the fixed-sample-rate digital-to-analog converter configured to convert the second transformed data to an analog optical signal.

13. The baud-rate flexible optical transmitter of claim 11, further comprising:
fourth circuitry, upstream of the third circuitry, configured to spectrally shape the duplicated data, resulting in spectral-shaped data, prior to the third circuitry's transformation of the 2N frequency domain samples from the frequency domain to the time domain.

14. The baud-rate flexible optical transmitter of claim 11, further comprising:
fourth circuitry, upstream to the third circuitry, configured to discard a set of samples from the 2N frequency domain samples of the duplicated data, resulting in down-sampled data.

15. The baud-rate flexible optical transmitter of claim 13, further comprising:
fifth circuitry, upstream to the fourth circuitry, configured to discard a set of samples from the 2N frequency domain samples of the duplicated data, resulting in down-sampled data.

16. The baud-rate flexible optical transmitter of claim 13, further comprising:
fifth circuitry, upstream to the fourth circuitry, configured to pad the 2N frequency domain samples of the duplicated data.

17. The baud-rate flexible optical transmitter of claim 11, further comprising:
fifth circuitry, upstream to the third circuitry, configured to pad the 2N frequency domain samples of the duplicated data.

18. The baud-rate flexible optical transmitter of claim 11, wherein the first circuitry comprises:
sub-circuitry configured to arrange the input data having N symbols into multiple parts; and
a set of sub-circuitries configured to transform, via respective sub-Fourier Transforms, each of the multiple parts of the input data having N symbols from the time domain to the frequency domain, individually.

19. A system, comprising:
signal converter circuitry, comprising:
a first interface configured to receive a digital electrical signal comprising a block of input data having N symbols in a time domain;
first transform circuitry configured to transform, via a Fourier Transform, the input data having N symbols from the time domain to a frequency domain, resulting in first transformed data;
up-sample circuitry configured to duplicate and concatenate N frequency domain samples of the first transformed data resulting in duplicated data comprising 2N frequency domain samples; and
second transform circuitry configured to transform, via an inverse Fourier Transform, the duplicated data from the frequency domain to the time domain resulting in second transformed data comprising 2N time domain samples and communicate the second transformed data to a fixed-sample-rate digital-to-analog converter; the fixed-sample-rate digital-to-analog converter configured to convert the digital electrical signal having the 2N time domain samples to an analog optical signal;
a second interface configured to interface the second transform circuitry to the digital-to-analog converter; and
a third interface operable to transmit the analog optical signal.

20. The system of claim 19, wherein the first transform circuitry further comprises:
sub-circuitry configured to arrange the input data having N symbols into multiple parts; and
a set of sub-circuitries configured to transform, via respective sub-Fourier Transforms, each of the multiple parts of the input data having N symbols from the time domain to the frequency domain, individually.

* * * * *